(12) United States Patent
Reda et al.

(10) Patent No.: US 10,580,159 B2
(45) Date of Patent: Mar. 3, 2020

(54) COARSE ORIENTATION DETECTION IN IMAGE DATA

(71) Applicant: Siemens Healthcare GmbH, Erlangen (DE)

(72) Inventors: Fitsum Aklilu Reda, West Chester, PA (US); Parmeet Singh Bhatia, Frazer, PA (US); Yiqiang Zhan, Berwyn, PA (US); Xiang Sean Zhou, Exton, PA (US)

(73) Assignee: Siemens Healthcare GmbH, Erlangen (DE)

( * ) Notice: Subject to any disclaimer, the term of this patent is extended or adjusted under 35 U.S.C. 154(b) by 184 days.

(21) Appl. No.: 15/877,485

(22) Filed: Jan. 23, 2018

(65) Prior Publication Data

US 2018/0218516 A1  Aug. 2, 2018

Related U.S. Application Data

(60) Provisional application No. 62/452,462, filed on Jan. 31, 2017.

(51) Int. Cl.
*G06T 7/11* (2017.01)
*G06K 9/66* (2006.01)
*G06N 3/08* (2006.01)
*G06T 7/00* (2017.01)
*G06T 7/70* (2017.01)

(52) U.S. Cl.
CPC ............ *G06T 7/70* (2017.01); *G06K 9/66* (2013.01); *G06N 3/08* (2013.01); *G06T 7/0012* (2013.01); *G06T 7/11* (2017.01); *G06T 2207/10081* (2013.01); *G06T 2207/10088* (2013.01); *G06T 2207/10104* (2013.01); *G06T 2207/10108* (2013.01); *G06T 2207/10136* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2015/0324999 A1  11/2015  Gritsenko et al.
2018/0259608 A1* 9/2018  Golden .................. G06N 3/084

OTHER PUBLICATIONS

Extended European Search Report in EP Application No. 18153887.7 dated Mar. 26, 2018, 12 pages.
Boone, John M., Sadananda Seshagiri, and Robert M. Steiner. "Recognition of chest radiograph orientation for picture archiving and communications systems display using neural networks." Journal of Digital Imaging 5.3 (1992): 190.

(Continued)

*Primary Examiner* — Idowu O Osifade (57) ABSTRACT

A framework for coarse orientation detection in image data. In accordance with one aspect, the framework trains a learning structure to recognize a coarse orientation of the anatomical structure of interest based on training images. The framework may then pass one or more current images through the trained learning structure to generate a coarse orientation of the anatomical structure of interest. The framework then outputs the generated coarse orientation of the anatomical structure of interest.

20 Claims, 6 Drawing Sheets

(56) References Cited

OTHER PUBLICATIONS

Bağci, Ulaş, Jayaram K. Udupa, and Xinjian Chen. "Orientation estimation of anatomical structures in medical images for object recognition." Medical Imaging 2011: Image Processing. vol. 7962. International Society for Optics and Photonics, 2011.

T.F. Cootes et al."Active Shape Models—Their Training and Application", Computer Vision and Image Understanding, 61 (1): pp. 38-59, 1995.

Girshick, Ross. "Fast r-cnn." Proceedings of the IEEE international conference on computer vision. 2015.

Heimann T., Meinzer H.: "Statistical shape models for 3D medical image segmentation: a review", in: Medial Image Analysis, vol. 13, No. 4, pp. 543-563, 2009.

Krizhevsky, et al.: "ImageNet Classification with Deep Convolutional Neural Networks", in: Advances in neural information processing systems, 2012.

Reda, Fitsum A., et al. "Sparse appearance model-based algorithm for automatic segmentation and identification of articulated hand bones." SPIE Medical Imaging. International Society for Optics and Photonics, 2014.

Reda, et al. "A Steering Engine: Learning #-D Anatomy Orientation Using Regression Forests." International Conference on Medical Image Computing and Computer-Assisted Intervention. Springer International Publishing, 2015.

Redmon, et al.: "You Only Look Once: Unified, Real-Time Object Detection", in: CVPR, 2016, pp. 779-788.

Ren, Shaoqing, et al. "Faster R-CNN: Towards real-time object detection with region proposal networks." Advances in neural information processing systems. 2015.

K. Simonyan, A. Zisserman. "Very deep convolutional networks for large-scale image classification." ICLR, 2015.

Srivastava, Nitish, et al. "Dropout: a simple way to prevent neural networks from overfitting." Journal of machine learning research 15.1 (2014): 1929-1958.

Zhang, Dongqing, et al. "Automatic localization of landmark sets in head CT images with regression forests for image registration initialization." Proceedings of SPIE—the International Society for Optical Engineering. vol. 9784. NIH Public Access, 2016.

* cited by examiner

COARSE ORIENTATION DETECTION IN IMAGE DATA

CROSS-REFERENCE TO RELATED APPLICATION

The present application claims the benefit of U.S. provisional application No. 62/452,462 filed Jan. 31, 2017, the entire contents of which are herein incorporated by reference.

TECHNICAL FIELD

The present disclosure generally relates to digital medical image data processing, and more particularly to coarse orientation detection in image data.

BACKGROUND

The field of medical imaging has seen significant advances since the time X-Rays were first used to determine anatomical abnormalities. Medical imaging hardware has progressed from modern machines, such as Magnetic Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a computerized axial tomography (CAT) scanner, magnetic resonance imaging (MRI), etc. Digital medical images are typically either a two-dimensional ("2D") image made of pixel elements, a three-dimensional ("3D") image made of volume elements ("voxels") or a four-dimensional ("4D") image made of dynamic elements ("doxels"). Such 2D, 3D or 4D images are processed using medical image recognition techniques to determine the presence of anatomical abnormalities or pathologies, such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image are generally referred to as Computer-Aided Detection (CAD). A CAD system can process medical images, localize and segment anatomical structures, including possible abnormalities (or candidates), for further review. Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor in order to reach an early diagnosis.

Figure 1:
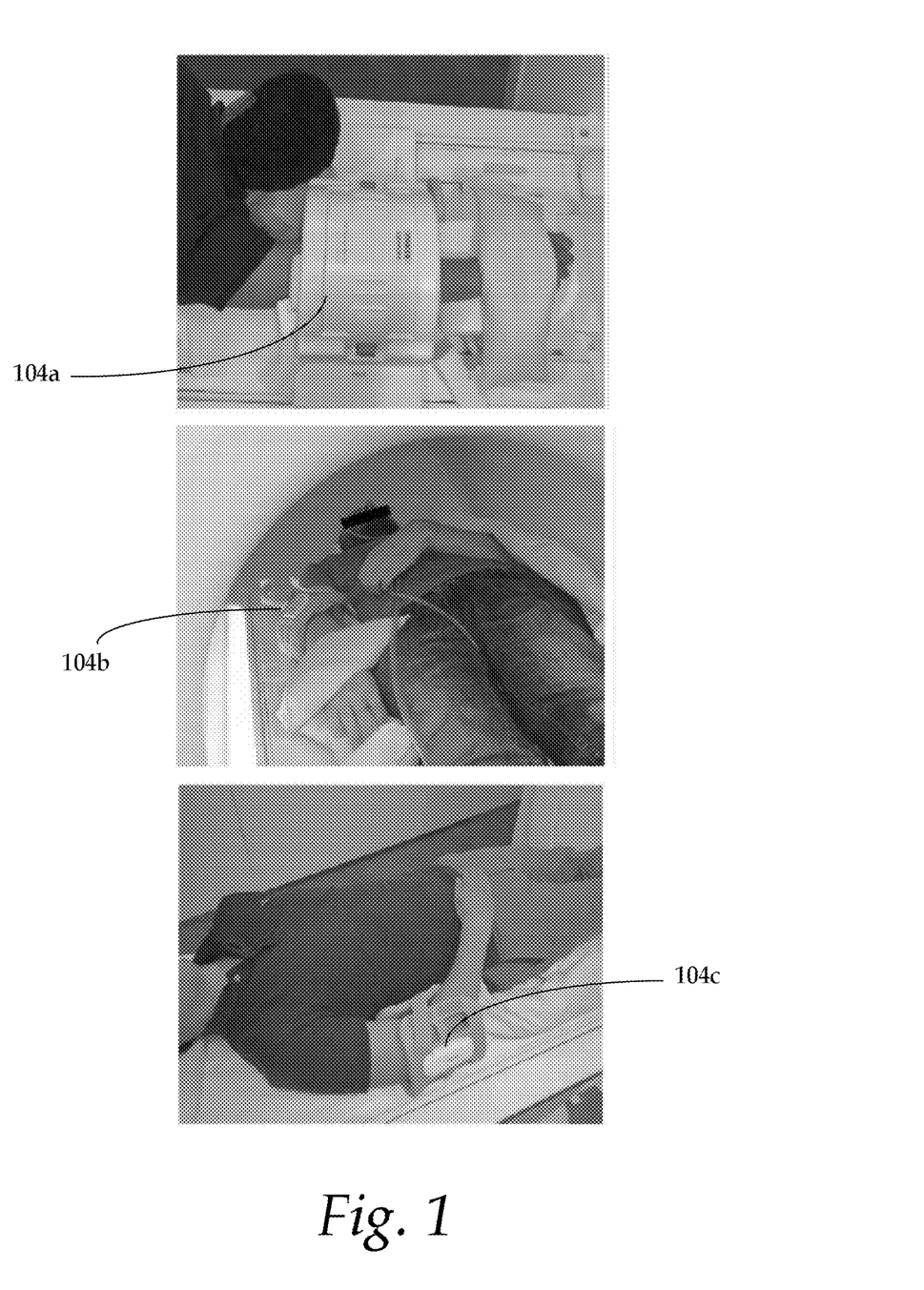
FIG. 1 shows typical positions and orientations of the elbow during MR scanning.

Due to several logistical or patient comfort constraints, MR scans of anatomical structures (e.g., elbow) may be acquired with the anatomical structure in an arbitrary position and orientation relative to the magnetic bores. FIG. 1 shows typical positions and orientations of the elbow 104a-c during MR scanning. Scans acquired with standardized orientation of the anatomical structure facilitates visualization or reading, comparison with past scans or imaging studies across patient populations. To achieve a standardized MR elbow scan reading, application specialists first acquire a scout scan of the elbow. This scout scan is then manually examined and a high-quality scan is acquired after the magnetic bore's or the elbow's position and orientation are adjusted to satisfy the desired imaging specifications. However, such image acquisition procedures are typically tedious and time-consuming.

SUMMARY

Described herein is a framework for coarse orientation detection in image data. In accordance with one aspect, the framework trains a learning structure to recognize a coarse orientation of the anatomical structure of interest based on training images. The framework may then pass one or more current images through the trained learning structure to generate a coarse orientation of the anatomical structure of interest. The framework then outputs the generated coarse orientation of the anatomical structure of interest.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed; on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to high-resolution computed tomography (HRCT), x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displayed as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

Automatically detecting anatomy orientation is very useful in medical image analysis. The ability to automatically detect coarse orientation of anatomical structures is useful for minimizing the resources required by fine (or accurate) orientation detection algorithms, to initialize non-rigid deformable registration algorithms or to align models to target structures in model-based segmentation algorithms. Automating scan acquisition procedures is also important to (a) minimize the overall time taken by the image acquisition procedure; and (b) achieve standardized and reproducible acquisition protocols. Hence, automatic identification of coarse orientation provides several advantages as a pre-processing step for more accurate and robust image processing and can also lead to more efficient clinical workflows.

A framework for automatic coarse orientation detection is described herein. In accordance with one aspect, the framework uses a deep convolutional neural network (DCNN)-based method to learn features that are well suited for fast and robust identification of coarse orientation. Coarse orientation may be identified by the hemi-sphere where the principal axis of a structure lies. The framework may predict whether the principal orientation of a structure is in the northern hemisphere (i.e., UP) or southern hemisphere (i.e., DOWN). The framework is based on the assumption that the entire anatomical structure is located within the scan's field-of-view (FOV).

Identifying the coarse orientation of an anatomical structure (e.g., elbow) in a given scan image (e.g., MR) is challenging owing to variations induced by different bore sizes, system fields-of-view and/or different anatomy angulations due to injuries and blockades. 3D CNNs are generally challenging to train due to scarcity of data and high-dimensional input space. To efficiently solve the problem in three-dimensional (3D) space and accommodate such variations, a multi-planar two-dimensional (2D) deep learning framework may be used instead of working directly in the 3D space. In the training stage of the framework, a large number of coronal-sagittal slice pairs of the anatomical structure of interest may be constructed as two-channel images to train a DCNN to classify whether a scan is UP or DOWN. During testing, a small number of coronal-sagittal two-channel images are passed through the trained network. Finally, coarse orientation of the anatomical structure may be determined using majority voting.

The framework essentially learns various possible articulations and forms that an anatomical structure of interest may take in the multi-channel 2D images. Hence, a few randomly selected slices around a region of interest are sufficient to obtain desirable results. The present framework was tested using many elbow MR scan images. Experimental results suggest that only five two-channel images were sufficient to achieve a high success rate of 97.39%. The framework was also extremely fast and takes approximately 50 milliseconds per 3D MR scan. The framework is advantageously insensitive to the precise location of the anatomical structure in the FOV. These and other features and advantages will be described in more details herein.

Figure 2:
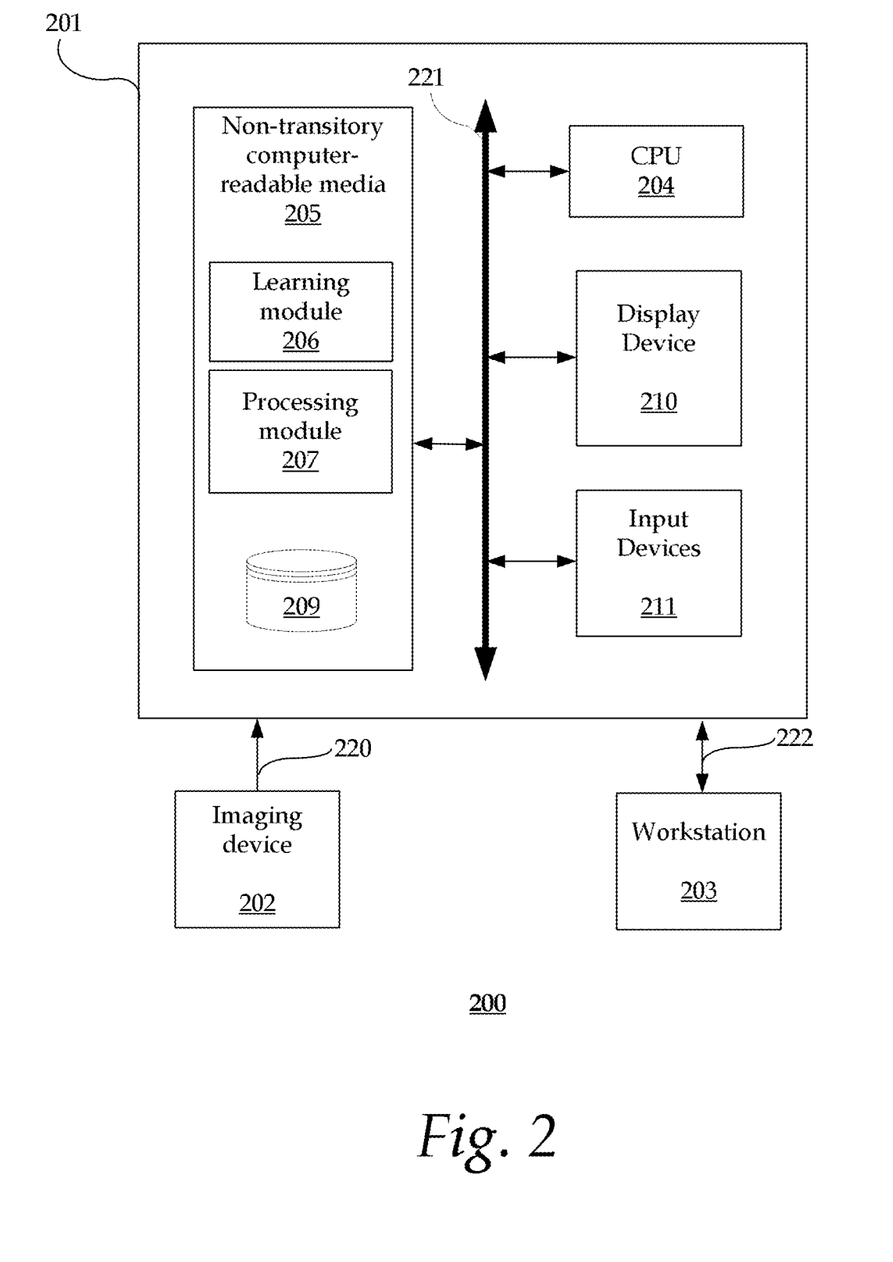
FIG. 2 is a block diagram illustrating an exemplary system.

FIG. 2 is a block diagram illustrating an exemplary system 200. The system 200 includes a computer system 201 for implementing the framework as described herein. In some implementations, computer system 201 operates as a standalone device. In other implementations, computer system 201 may be connected (e.g., using a network) to other machines, such as imaging device 202 and workstation 203. In a networked deployment, computer system 201 may operate in the capacity of a server (e.g., thin-client server), a cloud computing platform, a client user machine in server-client user network environment, or as a peer machine in a peer-to-peer (or distributed) network environment.

In some implementations, computer system 201 comprises a processor or central processing unit (CPU) 204 coupled to one or more non-transitory computer-readable media 205 (e.g., computer storage or memory), display device 210 (e.g., monitor) and various input devices 211 (e.g., mouse or keyboard) via an input-output interface 221. Computer system 201 may further include support circuits such as a cache, a power supply, clock circuits and a communications bus. Various other peripheral devices, such as additional data storage devices and printing devices, may also be connected to the computer system 201.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 205. In particular, the present techniques may be implemented by learning module 206, processing module 207 and database 209.

Non-transitory computer-readable media 205 may include random access memory (RAM), read-only memory (ROM), magnetic floppy disk, flash memory, and other types of memories, or a combination thereof. The computer-readable program code is executed by CPU 204 to process medical data retrieved from, for example, database 209. As such, the computer system 201 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 205 may be used for storing a database (or dataset) 209. Such data may also be stored in external storage or other memories. The external storage may be implemented using a database management system (DBMS) managed by the CPU 204 and residing on a memory, such as a hard disk, RAM, or removable media. The external storage may be implemented on one or more additional computer systems. For example, the external storage may include a data warehouse system residing on a separate computer system, a cloud platform or system, a picture archiving and communication system (PACS), or any other hospital, medical institution, medical office, testing facility, pharmacy or other medical patient record storage system.

Imaging device 202 acquires medical images 220 associated with at least one patient. Such medical images 220 may be processed and stored in database 209. Imaging device 202 may be a radiology scanner (e.g., MR scanner) and/or appropriate peripherals (e.g., keyboard and display device) for acquiring, collecting and/or storing such medical images 220.

The workstation 203 may include a computer and appropriate peripherals, such as a keyboard and display device, and can be operated in conjunction with the entire system 200. For example, the workstation 203 may communicate directly or indirectly with the imaging device 202 so that the medical image data acquired by the imaging device 202 can be rendered at the workstation 203 and viewed on a display device. The workstation 203 may also provide other types of medical data 222 of a given patient. The workstation 203 may include a graphical user interface to receive user input via an input device (e.g., keyboard, mouse, touch screen voice or video recognition interface, etc.) to input medical data 222.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 3:
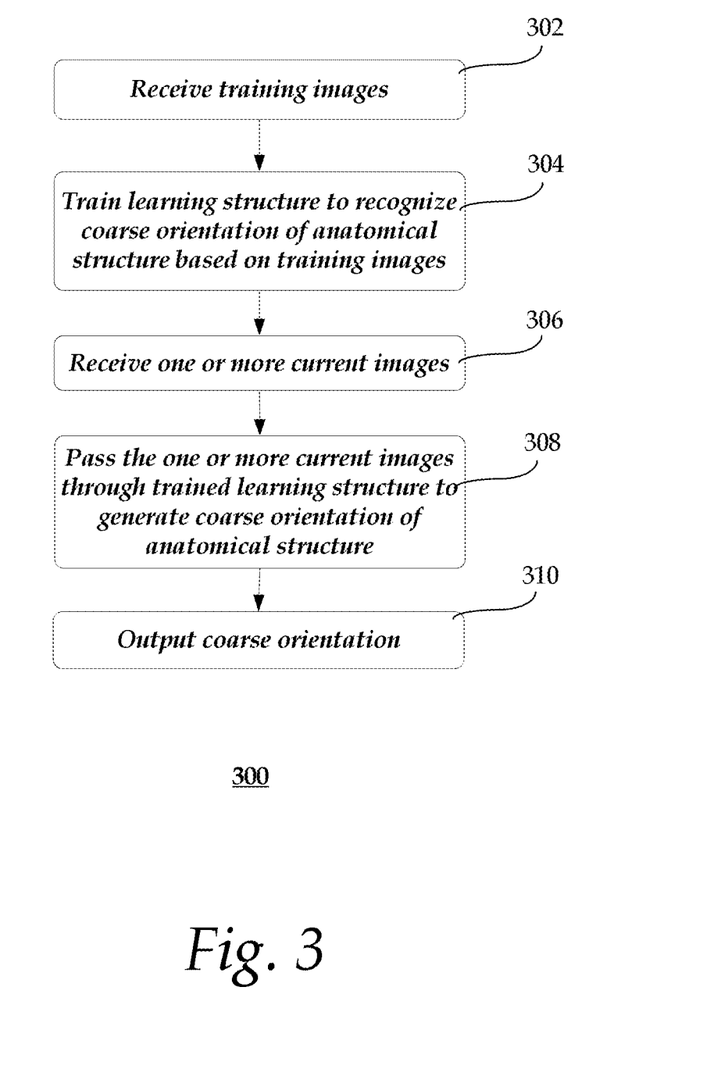
FIG. 3 shows an exemplary method of coarse orientation detection by a computer system.

FIG. 3 shows an exemplary method 300 of coarse orientation detection by a computer system. It should be understood that the steps of the method 300 may be performed in the order shown or a different order. Additional, different, or fewer steps may also be provided. Further, the method 300 may be implemented with the system 201 of FIG. 2, a different system, or a combination thereof.

At 302, learning module 206 receives training images. The training images may be acquired by using techniques such as high-resolution computed tomography (HRCT), magnetic resonance (MR) imaging, computed tomography (CT), helical CT, X-ray, angiography, positron emission tomography (PET), fluoroscopy, ultrasound, single photon emission computed tomography (SPECT), or a combination thereof. The training images may be retrieved from, for example, database 209 and/or acquired by imaging device 202. The training images may be randomly generated from one or more 3D image volumes acquired in one or more imaging scans of an anatomical structure of interest. The training images may include two-channel 2D images. Each two-channel image may include a pair of corresponding coronal and sagittal slices of the anatomical structure of interest. The anatomical structure of interest is a body portion that has been identified for investigation. The anatomical region of interest may be, for example, at least a section of a subject's elbow, spine, vertebra, and so forth.

Figure 4:
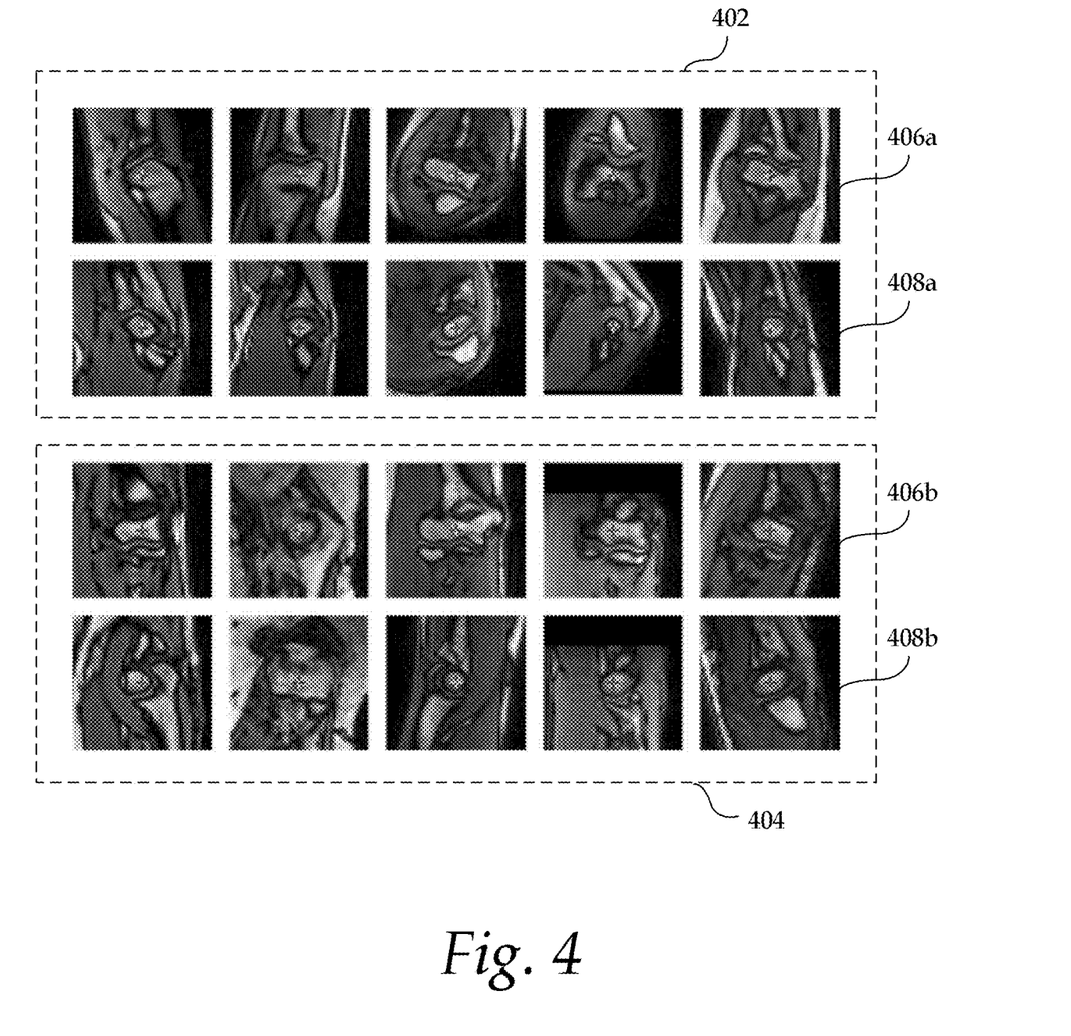
FIG. 4 shows exemplary 2D images for MR elbow scans.

FIG. 4 shows exemplary 2D images for MR elbow scans. More particularly, the 2D images 402 in the top two rows are in the UP orientation, while the 2D images 404 in the bottom two rows are in the DOWN orientation. Images 406a-b in first and third rows are along the sagittal plane, while images 408a-b in the second and fourth rows are along coronal plane. It can be observed that there are intra-class variations in the UP and DOWN orientations due to different articulations and flipping, which makes identifying the elbow orientation challenging even for the trained human. Fortunately, coronal and sagittal slices together provide sufficient information for this task. The present framework assumes that the entire anatomical structure is located within the scan's (e.g., MR) field-of-view (FOV). Several two-channel training images may be randomly generated within the FOV. All training images generated from same scan are assigned the same label as the global orientation of the scan.

Returning to FIG. 3, at 304, learning module 206 trains a learning structure to recognize coarse orientation of the anatomical structure of interest based on the training images. To train the learning structure, all the training images may be shuffled and passed through the learning structure to learn its parameters and identify anatomy coarse orientation. The coarse orientation may be identified by the principal hemisphere of the structure axis (i.e., UP or DOWN orientation), thereby reducing the recognition task to a binary classification task.

In some implementations, the learning structure is an unsupervised learning structure that automatically discovers representations needed for feature detection instead of relying on labeled input. The learning structure may be a deep learning architecture that includes stacked layers of learning nodes. The learning structure may be represented by, for example, a convolutional neural network (CNN) classifier. CNN is a class of deep, feed-forward artificial neural network that uses a variation of multilayer perceptrons designed to require minimal preprocessing. Other types of classifiers, such as random forests, may also be used.

Figure 5:
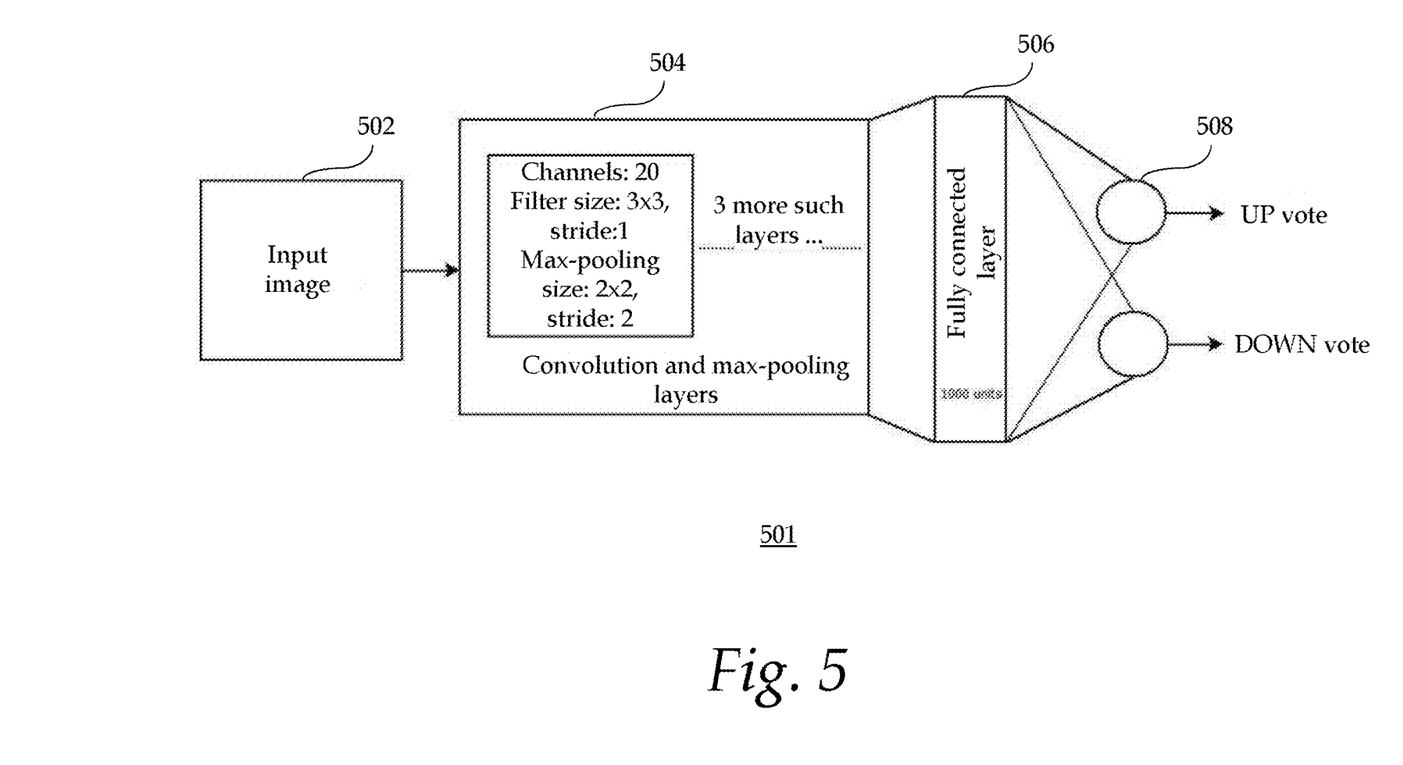
FIG. 5 shows an exemplary architecture of the convolutional neural network (CNN) learning structure.

FIG. 5 shows an exemplary architecture 501 of the CNN learning structure. The CNN learning structure may include an input layer 502, an output layer 508, as well as multiple hidden layers 504 and 506. The hidden layers 504 and 506 are either convolutional, pooling or fully connected. Convolutional layers apply a convolution operation to the input, passing the result to the next layer, thereby emulating the response of an individual neuron to visual stimuli. Pooling layers combine the outputs of neuron clusters at one layer into a single neuron in the next layer, while fully connected layers connect every neuron in one layer to every neuron in another layer.

As shown, the input image (e.g., training image) 502 is fed to hidden layers 504. The number of convolutional layers as well as number of channels in each convolutional layer in the hidden layers 504 may be reduced to achieve real-time performance. In some implementations, four convolutional layers, each with 20 channels and followed by a max-pooling layer, are sufficient to attain the desired accuracy. The number of channels and filter size in all the convolution layers may be, for example, 20 and 3×3 respectively. The final max-pooling layer may be fed into one fully connected layer 506, which may be finally fed to soft-max classification layer 508 with two units. The soft-max classification layer 508 may then output a coarse orientation vote (i.e., UP or DOWN).

To regularize the structure, a dropout mechanism may be used. The dropout mechanism is a regularization technique for reducing overfitting in neural networks by preventing complex co-adaptations on training data. See, for example, Srivastava, N., Hinton, G. E., Krizhevsky, A., Sutskever, I., and Salakhutdinov, R., *Dropout: a simple way to prevent neural networks from overfitting*, Journal of Machine Learning Research 15(1), 1929-1958 (2014), which is herein incorporated by reference. In some implementations, a dropout layer with dropout of a probability of, for example, 0.5, is inserted before the fully connected layer 506. The network weights may then be updated using a stochastic gradient descent algorithm.

Returning to FIG. 3, at 306, processing module 207 receives one or more current images. The one or more current images may be acquired by the same imaging modality as the training images. Additionally, the one or more current images may be randomly generated from a current 3D image volume acquired in a single imaging scan (e.g., MR scan). Each current image may be a two-channel 2D image including a pair of corresponding coronal and sagittal slices of the anatomical structure of interest.

At 308, processing module 207 passes the one or more current images through the trained learning structure to generate a coarse orientation of the anatomical structure. Each current image may be assigned a coarse orientation (e.g., UP or DOWN) label based on the output results of the trained learning structure. The final orientation of the anatomical structure of interest may be decided based on the coarse orientations labels using, for example, simple majority voting scheme.

At 310, processing module 207 outputs the coarse orientation of the anatomical structure. The coarse orientation may be displayed at, for example, workstation 203. The coarse orientation may be used to automatically control an imaging device (e.g., MR scanner) for image acquisition. The coarse orientation may also be input into another image processing algorithm to provide accurate and robust processing results.

In some implementations, the coarse orientation detection method 300 may serve as a pre-processing process for a medical image processing algorithm. The medical imaging algorithm may be, for instance, a fine orientation detection algorithm (e.g., Steering-Engine 1), end-to-end orientation detection or marginal space learning (MSL). The Steering-Engine may take more iterations to converge at a final solution if the initial and the actual coarse orientations lie in different hemi-spheres. Similarly, the MSL search space for quantized orientation may be effectively reduced to half given the hemi-sphere of structure of interest.

In other implementations, the coarse orientation is used to initialize images prior to performing an image processing algorithm, such as registration (e.g., non-rigid registration) or segmentation (e.g., active shape models, statistical shape models). Image registration techniques aim to establish correspondence between images, and are at the core of many applications in medical imaging. Many registration methods are dependent on a good initialization. The initialization may be performed by manually aligning the images, or by calculating landmark-based point set transformation between two images. However, manual alignment is not a desirable solution as it is very time consuming. Furthermore, landmark detection algorithms may suffer in precisely locating points of interest owing to variations like rotation and articulation. Segmentation algorithms like active shape models and statistical shape models also rely on initialization and perform best when initialization is not too far from final solution. Hence, coarse orientation detection may facilitate precise landmark localization as well as provide better initialization strategies for registration, fine orientation detection and segmentation algorithms.

To validate the present framework, an experiment was performed based on a total of 114 MR elbow scans. There were 64 and 50 scans in the UP and DOWN orientation respectively. A two-fold cross-validation was performed. Due to a limited number of dataset, the validation set was not explicitly created. Instead, the model was selected after training it for 5 epochs. During training, 500 randomly generated 2D multi-channel images were used from each MR scan, leading to a total of 28500 training patches. During testing, majority voting was used on 5 randomly generated images to obtain the final coarse orientation result.

Since during testing the images were generated at random, slightly different results may be obtained over different runs on the same MR scan. Hence, to showcase performance numbers, experiments were simulated by running the test 100 times using the same trained learning structure and the average accuracy was reported. An average accuracy of 97.39% was obtained in a two-fold cross-validation using majority voting with 5 images.

Figure 6A:
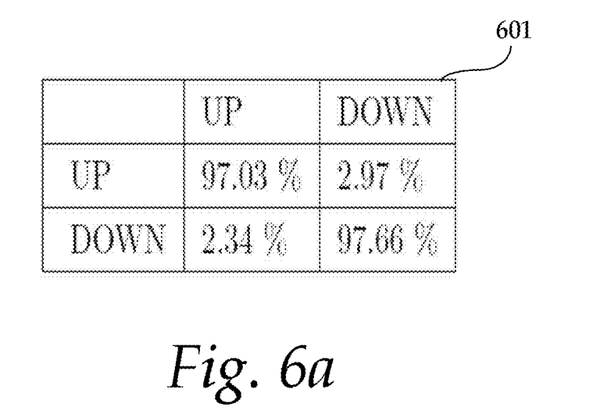
FIG. 6a shows the average confusion matrix over 100 simulations.
Figure 6B:
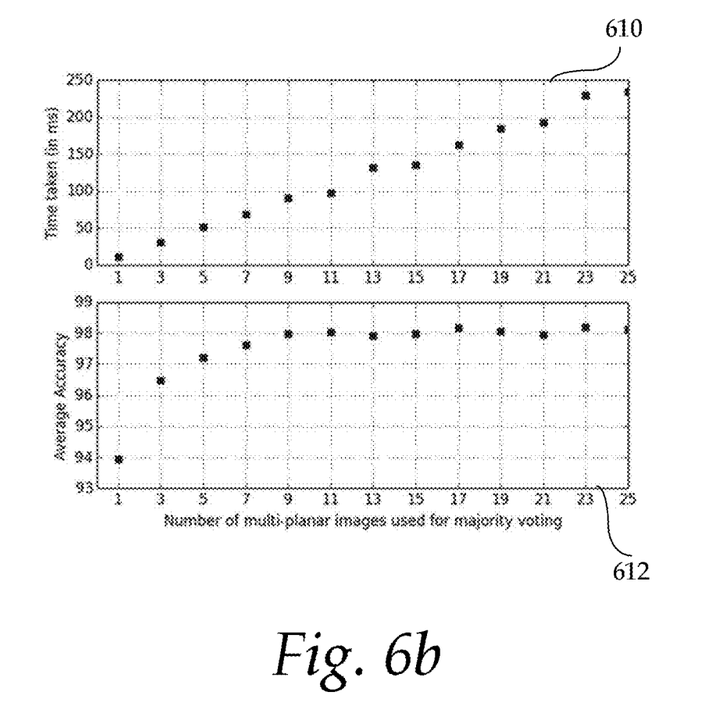
FIG. 6b shows graphs of the running time (in milliseconds) and average accuracy respectively of the present framework with respect to the number of multi-planar images used for majority voting.

FIG. 6a shows the average confusion matrix 601 over 100 simulations. FIG. 6b shows graphs 610 and 612 of the running time (in milliseconds) and average accuracy respectively of the present framework with respect to the number of multi-planar images used for majority voting. All timings were obtained on a single core standard central processing unit (CPU) setting. Notice that the accuracy saturates at 98% after using 9 images for majority voting. Further notice that the time taken for 9 images is almost doubled compared to time taken when 5 images are used for majority voting with only minor increase in accuracy. The gain is not statistically huge compared to the overall increase in computation time. Hence, the number of images may be kept to 5 during testing to obtain desirable results.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A system for coarse orientation detection, comprising:
   a non-transitory memory device for storing computer readable program code; and
   a processor device in communication with the memory device, the processor being operative with the computer readable program code to perform steps including
   receiving training images of an anatomical structure of interest,
   training a convolutional neural network to recognize a coarse orientation of the anatomical structure of interest based on the training images,
   receiving one or more current images of the anatomical structure of interest,
   passing the one or more current images through the trained convolutional neural network to generate the coarse orientation of the anatomical structure of interest, and
   controlling an imaging device for image acquisition based on the generated coarse orientation.

2. The system of claim 1 wherein the training images of the anatomical structure of interest comprises two-channel two-dimensional (2D) images generated from one or more three-dimensional (3D) image volumes.

3. The system of claim 2 wherein the 2D images comprise pairs of corresponding coronal and sagittal slices of the anatomical structure of interest.

4. The system of claim 1 wherein the processor is operative with the computer readable program code to train the convolutional neural network to recognize the coarse orientation of the anatomical structure of interest based on the training images by training the convolutional neural network to recognize a principal hemisphere of an axis of the structure of interest.

5. A method of coarse orientation detection, comprising:
   receiving training images of an anatomical structure of interest;
   training a learning structure to recognize a coarse orientation of the anatomical structure of interest based on the training images;
   receiving one or more current images of the anatomical structure of interest;
   passing the one or more current images through the trained learning structure to generate the coarse orientation of the anatomical structure of interest; and
   outputting the generated coarse orientation of the anatomical structure of interest.

6. The method of claim 5 wherein receiving the training images of the anatomical structure of interest comprises receiving two-channel two-dimensional (2D) images generated from one or more three-dimensional (3D) image volumes.

7. The method of claim 6 wherein receiving the 2D images comprises receiving pairs of corresponding coronal and sagittal slices of the anatomical structure of interest.

8. The method of claim 5 wherein training the learning structure to recognize the coarse orientation of the anatomical structure of interest based on the training images comprises training the learning structure to recognize a principal hemisphere of an axis of the structure of interest.

9. The method of claim 8 wherein training the learning structure to recognize the principal hemisphere comprises training the learning structure to identify an UP or DOWN orientation.

10. The method of claim 5 wherein training the learning structure to recognize the coarse orientation of the anatomical structure of interest based on the training images comprises training a convolutional neural network (CNN) classifier.

11. The method of claim 10 wherein training the convolutional neural network (CNN) classifier comprises feeding the training images through hidden layers including convolutional layers and max-pooling layers.

12. The method of claim 11 wherein training the convolutional neural network (CNN) classifier further comprises feeding one of the max-pooling layers to a fully connected layer, and feeding the fully connected layer to a soft-max classification layer that outputs a coarse orientation vote.

13. The method of claim 11 wherein training the convolutional neural network (CNN) classifier further comprises feeding one of the max-pooling layers to a dropout layer for regularization.

14. The method of claim 5 wherein receiving the one or more current images of the anatomical structure of interest comprises receiving one or more two-channel two-dimensional (2D) images generated from a current three-dimensional (3D) image volume.

15. The method of claim 14 wherein receiving the one or more 2D images of the anatomical structure of interest comprises receiving one or more pairs of corresponding coronal and sagittal slices of the anatomical structure of interest.

16. The method of claim 5 wherein passing the one or more current images through the trained learning structure to generate the coarse orientation of the anatomical structure of interest comprises assigning the current images with coarse orientation labels based on output results of the trained learning structure and determining the coarse orientation using a simple majority voting scheme based on the coarse orientation labels.

17. The method of claim 5 wherein outputting the generated coarse orientation of the anatomical structure of interest comprises automatically controlling an imaging device for image acquisition based on the generated coarse orientation.

18. The method of claim 5 wherein outputting the generated coarse orientation of the anatomical structure of interest comprises inputting the generated coarse orientation to another image processing algorithm.

19. The method of claim 5 wherein outputting the generated coarse orientation of the anatomical structure of interest comprises using the generated coarse orientation to initialize images prior to performing registration or segmentation.

20. One or more non-transitory computer readable media embodying a program of instructions executable by a machine to perform operations for coarse orientation detection, the operations comprising:
   receiving training images of an anatomical structure of interest;
   training a learning structure to recognize a coarse orientation of the anatomical structure of interest based on the training images;
   receiving one or more current images of the anatomical structure of interest;
   passing the one or more current images through the trained learning structure to generate the coarse orientation of the anatomical structure of interest; and
   outputting the generated coarse orientation of the anatomical structure of interest.

* * * * *